US006954901B1

(12) United States Patent  
Desai et al.

(10) Patent No.: US 6,954,901 B1  
(45) Date of Patent: Oct. 11, 2005

(54) METHOD AND SYSTEM FOR TRACKING A USER FLOW OF WEB PAGES OF A WEB SITE TO ENABLE EFFICIENT UPDATING OF THE HYPERLINKS OF THE WEB SITE

(75) Inventors: Sachin Desai, San Francisco, CA (US); Kiran Bellare, San Jose, CA (US)

(73) Assignee: Oracle International Corporation, Redwood Shores, CA (US)

( * ) Notice: Subject to any disclaimer, the term of this patent is extended or adjusted under 35 U.S.C. 154(b) by 566 days.

(21) Appl. No.: 10/016,947

(22) Filed: Dec. 13, 2001

(51) Int. Cl.[7] .............................................. G06F 3/00
(52) U.S. Cl. ..................... 715/745; 715/760; 715/744; 715/501.1
(58) Field of Search .............................. 345/745, 747, 345/744, 741, 742, 743, 733, 738, 760, 854, 345/853, 825, 811, 812, 700; 715/501.1, 715/513, 700; 709/201, 202, 218, 220, 228, 709/227, 229

(56) References Cited

U.S. PATENT DOCUMENTS

| 5,634,062 | A | | 5/1997 | Shimizu et al. ............. 395/762 |
| 5,968,125 | A | | 10/1999 | Garrick et al. ............. 709/224 |
| 6,038,598 | A | * | 3/2000 | Danneels ................. 345/738 X |
| 6,088,707 | A | | 7/2000 | Bates et al. ................. 707/501 |
| 6,144,962 | A | | 11/2000 | Weinberg et al. ............. 707/10 |
| 6,327,628 | B1 | * | 12/2001 | Anuff et al. ......... 715/501.1 X |
| 2002/0152237 | A1 | * | 10/2002 | Cohen et al. ................ 715/513 |

\* cited by examiner

Primary Examiner—Raymond J. Bayerl
(74) Attorney, Agent, or Firm—Wagner, Murabito & Hao LLP

(57) ABSTRACT

A method for tracking a user flow of Web pages of a Web site to enable efficient updating of the hyperlinks of the Web site. A Web page is accessed out of a plurality of Web pages of a Web site. A set of actions available to a user are determined for the Web page. A set of the next pages linked to the Web page are determined for the Web page. A set of rules are defined that modify the set of actions available to the user or the set of next pages linked to the Web page in accordance with an identity of the user. The set of actions, the set of next pages, and the set of rules are stored in a table data structure for the Web page to track a user flow of the Web page. The table data structure enables the user flow of the Web page to be changed by altering the corresponding set of rules in the table data structure for the Web page. Similarly, the user flow can be changed by altering the set of actions available to the user, or by altering the set of next pages linked to the Web page in the table data structure for the Web page. A plurality of table data structures can be generated for each of the plurality of Web pages of the Web site, and the table data structures can be stored in a matrix to track a user flow of the entire Web site.

27 Claims, 4 Drawing Sheets

| CURRENT PAGE 201 | ACTION 202 | NEXT PAGE 203 | RULES 204 |
|---|---|---|---|
| SECTIONS PAGE 210 | -ADD -REM | PRODUCTS PAGE | PER CUSTOMER LINK ENABLE |
| | | | |
| | | | |
| | | | |
| | | | |
| | | | |
| | | | |

FIGURE 2

METHOD AND SYSTEM FOR TRACKING A USER FLOW OF WEB PAGES OF A WEB SITE TO ENABLE EFFICIENT UPDATING OF THE HYPERLINKS OF THE WEB SITE

FIELD OF THE INVENTION

The field of the present invention pertains to the management of Web pages on a distributed computer network. More particularly, the present invention relates to a method and system for monitoring Web page flow through hyperlinked Web pages and efficiently implementing Web page updates and changes on an Internet Web site.

BACKGROUND OF THE INVENTION

One of the most important societal changes of recent times has been the emergence of the Internet, more particularly, the World Wide Web (e.g., the Web), as a predominant communications medium. The Web presents a navigable aggregation of Web page content of all the Web connected computers. This navigable aggregation of content is linked in such a way as to offer users access to information and documentation, typically in the form of interactive hypermedia, or Web pages. Web pages describe documents in which hypertext links are used for connecting a multitude of combinations of graphics, audio, video, and text. Such combinations are often interlinked and interconnected in nonlinear, nonsequential manners.

Web page authors use specialized software, for example, HTML (hypertext markup language), Java, XML (extensible markup language), and the like, to create Web pages and to format the various hyperlinks, objects, fields, etc., within the Web pages. Web page authors also use a variety of tools to track the structure of the links between the many Web pages that comprise the Web site. The ability to define the interaction of many different Web pages with one another through the use of the hyperlinks enable the creation of powerful comprehensive Web sites directed towards particular needs or particular purposes. Examples include news portal Web sites, sports oriented Web sites, and particularly, electronic commerce oriented Web sites. The creation and updating of such large Web sites, having many hundreds of complex interlinked, interrelated Web pages, has become a very technical and manpower intensive undertaking.

The most basic component of Web page creation is the HTML editor. An HTML editor is a low-level Web site authoring tool that is essentially a text editor, specialized for writing HTML (Hypertext Markup Language) code. It assists the HTML author (e.g., the Web page author or Web site designer) by cataloging all HTML tags and common structures in menus and by being able to catch certain syntax errors. It often displays tags and contents in colors so they pop out for easy reference. HTML editors comprise the foundation of many different prior art Web authoring software tools. Web authoring software (e.g., often synonymous with Web development software) generates the required HTML code for the pages. Trained developers work with the HTML editors and the Web authoring software to produce the many Web pages of the Web site. Within a given Web site, collections of related Web pages are usually linked together using hypertext links, or hyperlinks. The basic structure of hyperlinked Web pages is designed to promote the process of browsing from one document to another along hypertext links. A significant amount of effort is expended to ensure the clarity and reliability of HTML code, the technical correctness of the Web pages, and the reliability and technical correctness of the many hundreds of hyperlinks embedded within the Web pages.

There exists a problem, however, in that site navigation for documents (e.g., Web pages) is performed via hyperlinks that are embedded within the HTML structure documents. These embedded hyperlinks can be static or dynamic to some extent, in that the parameters they pass are different, but the base URL (Uniform Resource Locator) is the same. Site navigation is therefore to some extent fixed. The nature of the hyperlinks leads users to "flow" from one page to another, following the interconnected hyperlinks from the original document (e.g., homepage) to the ultimate destination document. The embedded nature of the hyperlinks results in little or no control of the Web site author to change or alter the flow without having to rebuild Web pages, add new hyperlinks, or embed logic in a given Web page to control the flow.

Rebuilding Web pages is usually not a cost-effective option. To change the hyperlinks of a document, as with changes to the color, tabs, buttons, or the like, often requires completely rebuilding the page. With current Web site authoring tools there exists very tight constraints with regard to the code comprising the page. It is difficult to simply "cut and paste" changes into the page. Any new hyperlinks have to be verified to ensure they link to the correct Web pages. Changing hyperlinks introduces the possibility of "breaking" existing hyperlinks for other connected documents. Thus, it becomes expensive to implement changes to, for example, respond to competitors. It becomes expensive to quickly modify a user flow in response to changes in the products.

Thus, what is required is a way to simplify the process of maintaining a Web site. What is required is a solution that renders the update and maintenance process of a user flow of a Web site much easier than the prior art. What is required is a solution that simplifies the changing and maintaining of hyperlinks within Web pages of a Web site. The required solution should improve the speed and responsiveness of the resulting site to changing conditions, customers, and the like. The present invention provides a novel solution to these requirements.

SUMMARY OF THE INVENTION

The present invention provides a method and system for simplifying the process of maintaining a Web site. The present invention provides a solution that renders the update and maintenance process of a user flow of a Web site much easier than the prior art. The present invention provides a solution that simplifies the changing and maintaining of hyperlinks within the Web pages of a Web site. The present invention improves the speed and responsiveness of a Web site to changing conditions, customers, and the like. Additionally, the present invention streamlines the Web site maintenance process while retaining reliable technical aspects (e.g., java, HTML, etc.) of the Web site.

In one embodiment, the present invention is implemented as a computer implemented method for tracking a user flow of Web pages of a Web site to enable efficient updating of the hyperlinks of the Web site, such as, for example, an electronic commerce Web site. In this embodiment, for each Web page of the Web site, a Web page is accessed and a set of actions available to a user (e.g., add items to a shopping cart, remove items from shopping cart, or the like) are determined for the Web page. Similarly, a set of the next pages (e.g., product colors, features, customizations, etc.) linked to the Web page are determined. A set of rules are defined that modify the set of actions available to the user or the set of next pages linked to the Web page in accordance with any predetermined conditions, such as, for example, an identity of the user. For example, depending upon the identity of the user, a different set of Web pages listing prices, products, customizations, etc., specific to the user can be linked as next pages.

The set of actions, the set of next pages, and the set of rules are stored in a table data structure for the Web page to track a user flow of the Web page. The table data structure enables the user flow of the Web page to be changed by altering the corresponding set of rules in the table data structure for the Web page. Similarly, the user flow can be changed by altering the set of actions available to the user, or by altering the set of next pages linked to the Web page in the table data structure for the Web page. A plurality of Web pages can be stored within a single table data structures, or a plurality of table data structures can be generated for each of the plurality of Web pages of the Web site. The table data structures can be stored in a matrix to track a user flow of the entire Web site.

A graphical user interface is presented to the Web site manager (e.g., on a workstation display) that visually depicts the matrix of table data structures that characterize the flow of the Web site. Thus, the Web site manager can alter, modify, redefine, and otherwise manage the user flow of the entire Web site through the intuitive graphical user interface representation of the matrix of table data structures. In this manner, the present invention provides a solution that renders the update and maintenance process of a user flow of a Web site much easier than the prior art, and simplifies the changing and maintaining of hyperlinks within Web pages of a Web site.

BRIEF DESCRIPTION OF THE DRAWINGS

The present invention is illustrated by way of example and not by way of limitation, in the figures of the accompanying drawings and in which like reference numerals refer to similar elements and in which:

FIG. 2 shows a diagram at a table data structure in accordance with one embodiment of the present invention.

DETAILED DESCRIPTION OF THE INVENTION

Figure 1:
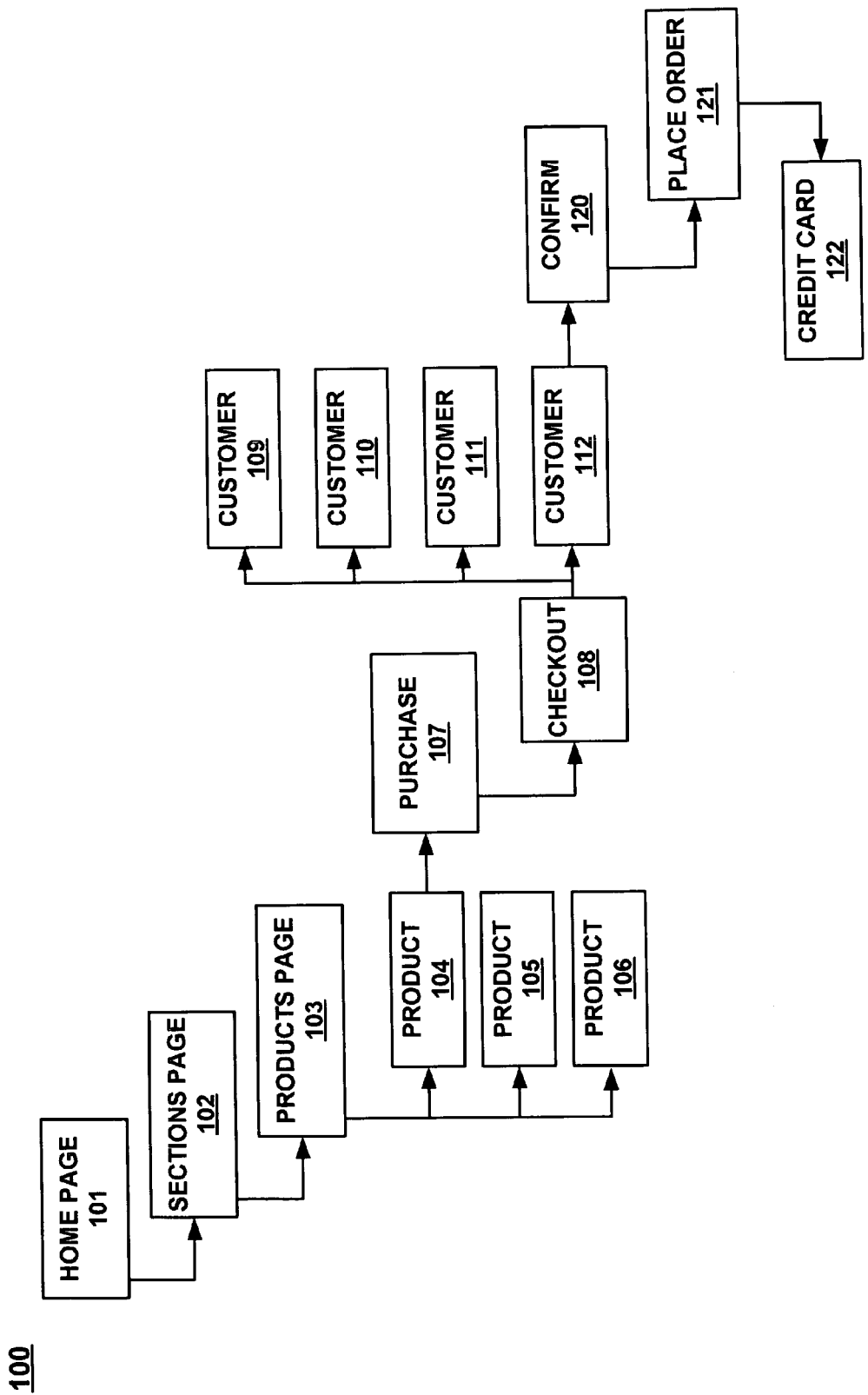
FIG. 1 shows an exemplary user flow of a Web site in accordance with one embodiment of the present invention.

Reference will now be made in detail to the embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well known methods, procedures, components, and circuits have not been described in detail as not to unnecessarily obscure aspects of the present invention.

Embodiments of the present invention are directed towards a computer implemented method for tracking a user flow of Web pages of a Web site to enable efficient updating of the hyperlinks of the Web site. The present invention provides a solution that renders the update and maintenance process of a user flow of a Web site much easier than the prior art. The present invention provides a solution that simplifies the changing and maintaining of hyperlinks within Web pages of a Web site. The present invention improves the speed and responsiveness of the resulting site to changing conditions, customers, and the like. Additionally, the present invention streamlines the Web site maintenance process while retaining reliable technical aspects (e.g., java, HTML, etc.) of the Web site. The present invention and its benefits are further described below.

Notation and Nomenclature

Some portions of the detailed descriptions which follow are presented in terms of procedures, steps, logic blocks, processing, and other symbolic representations of operations on data bits within a computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "computing" or "communicating" or "instantiating" or "registering" or "displaying" or the like, refer to the action and processes of a computer system (e.g., computer system 512 of FIG. 4), or similar electronic computing device, that manipulates and transforms data represented as physical (electronic) quantities within the computer system's registers and memories into other data similarly represented as physical quantities within the computer system memories or registers or other such information storage, transmission or display devices.

Method and System of the Invention

FIG. 1 shows an exemplary user flow 100 of a Web site in accordance with one embodiment of the present invention. As depicted in FIG. 1, user flow 100 includes the hyperlinked Web pages 101–122. In this case, user flow 100 depicts the sequence of pages presented to a user as in, for example, an electronic commerce based Web site.

The first page the user visits is the Web site homepage 101. As with many Web sites on the Internet, homepage 101 functions as the welcoming front-end of the Web site. As such, most of the user flows possible in the Web site begin with the homepage 101. As depicted in FIG. 1, the user flow continues from left to right, as the user hyperlinks to a sections page 102, then to a product page 103, and so on. The user flow concludes on the right hand side of FIG. 1, with the user hyperlinking through a confirmation page 120, a place order page 121, and ending at a credit card page 122.

Referring still FIG. 1, user flow 100 functions in a manner familiar to any person having experienced "Web surfing" on the Internet. As with conventional Web sites, the Web pages 101–122 are hyperlinked to one another via embedded hyperlinks within the structure of the Web pages themselves. These hyperlinks can be either static or dynamic to some extent depending upon the parameters they pass. However, in accordance with the present invention, user flow 100 is not fixed by the embedded hyperlinks of the Web pages 101–122. The interface of the present invention enables efficient control of user flow 100, allowing a Web site designer to alter user flow 100 without having to individually embed or change logic in a given page to control the flow.

In the present embodiment, the control of user flow 100 is provided through the use of an extended form of hyperlink in each of pages 101–122. In this embodiment, each of the hyperlinks controlling user flow 100 comprises an extended URL that takes in addition to the normal URL parameters, parameters that define the document presently viewed by the user (e.g., a current page) and the action being performed (e.g., clicking on objects in the Web page, adding to a shopping cart, removing from a shopping cart, etc.). Given this information, it's possible to determine the next logical flow by performing a lookup on a table that defines what the next Web page ought to be based on the page being viewed and the action taken. The information defined by the table and hence the flow of the Web site is determined by the Web site manager (e.g., the merchant), and can be stored in a database. The table(s) can also store additional information such as whether the next page being viewed should be viewed with a secure connection. Changing the user flow of an entire site therefore only requires changing the corresponding information stored in the table(s).

Alternatively, instead of predefining what the next page is going to be and storing this information in the table, a rule-based mechanism can be implemented which dynamically selects the next page using, for example, an inference engine, and also takes into account additional criteria such as the identity of the user, account type, etc. This solution works well for both static highly dynamic sites. The addition of the rule-based mechanism enables powerful dynamic control of a Web site.

User flow control in accordance with present invention provides a number of advantages. For example, user flow 100 can be managed via a GUI that graphically depicts and allows editing of the information stored within the one or more tables for the Web site. This is very much different from the prior art methods of modifying individual Web page files. User flow control in accordance with present invention facilitates the tracking and management changes through an approval process. User flow 100 can be changed in an instant without having to modify the files comprising Web pages 101–122. In so doing, the Web site truly becomes dynamic in nature, able to easily change and respond to different conditions and competitors of the marketplace. The rule-based mechanism allows a merchant to easily define the flow for different types of accounts and/or for different individual customers. For example, a first-time customer would see a different set of price lists (e.g., customer price lists 109–112) than a large high-volume customer. Similarly, for example, and outside supplier would see a different set of products (e.g., product descriptions 104–106) than a division within the merchant's company.

FIG. 2 shows a diagram of a table data structure 200 in accordance with one embodiment of the present invention. As depicted in FIG. 2, table data structure 200 (hereafter table 200) includes columns for the current page 201, an action 202, next page 203, and rules 204.

In this embodiment, flow information for each of the Web pages within the Web site are stored within the table 200 to present an overall view of the user flow. A first row 210 of table 200 shows entries for the sections page 102 of FIG. 1, as shown by the entry in the current page column 201. For the sections page 102, the set of actions available to a user (e.g., add items to a shopping cart, remove items from the shopping cart, or the like) are listed in the actions column 202. Similarly, the set of the next pages (e.g., product colors, features, customizations, etc.) linked to the sections page 102 are listed in the next page column 203. A set of rules that define and/or modify the set of actions available to the user or the set of next pages linked to the sections page 102 are listed in the rules column 204.

In this manner, the set of actions, the set of next pages, and the set of rules are stored in a table data structure 200 to enable a Web site manager to intuitively track a user flow of the Web page. The table data structure enables the user flow of the Web page to be changed by altering the corresponding set of rules in the table data structure for the Web page. Similarly, by using the table data structure for the Web page, the user flow can be changed by altering the set of actions available to the user, or by altering the set of next pages linked to the Web page. A number of Web pages of the Web site can be stored on successive rows of table 200 in the same manner as sections page 102. Similarly, a number of table data structures can be generated to catalog all of the Web pages of the Web site, and the table data structures can be stored in a matrix to track a user flow of the entire Web site.

The tabular quality of table 200 is well suited for use with a graphical user interface software application. For example, table 200 can be presented to the Web site manager (e.g., on a workstation display), either alone or with a set of such tables, to visually depict the flow of the Web site. Thus, for example, the Web site manager can alter, create, redefine, and otherwise manage the user flow of the entire Web site through the intuitive graphical user interface representation of a matrix of table data structures. In this manner, the present invention provides a solution that renders the update and maintenance process of a user flow of a Web site much easier than the prior art, and simplifies the changing and maintaining of hyperlinks within Web pages of a Web site.

Figure 3:
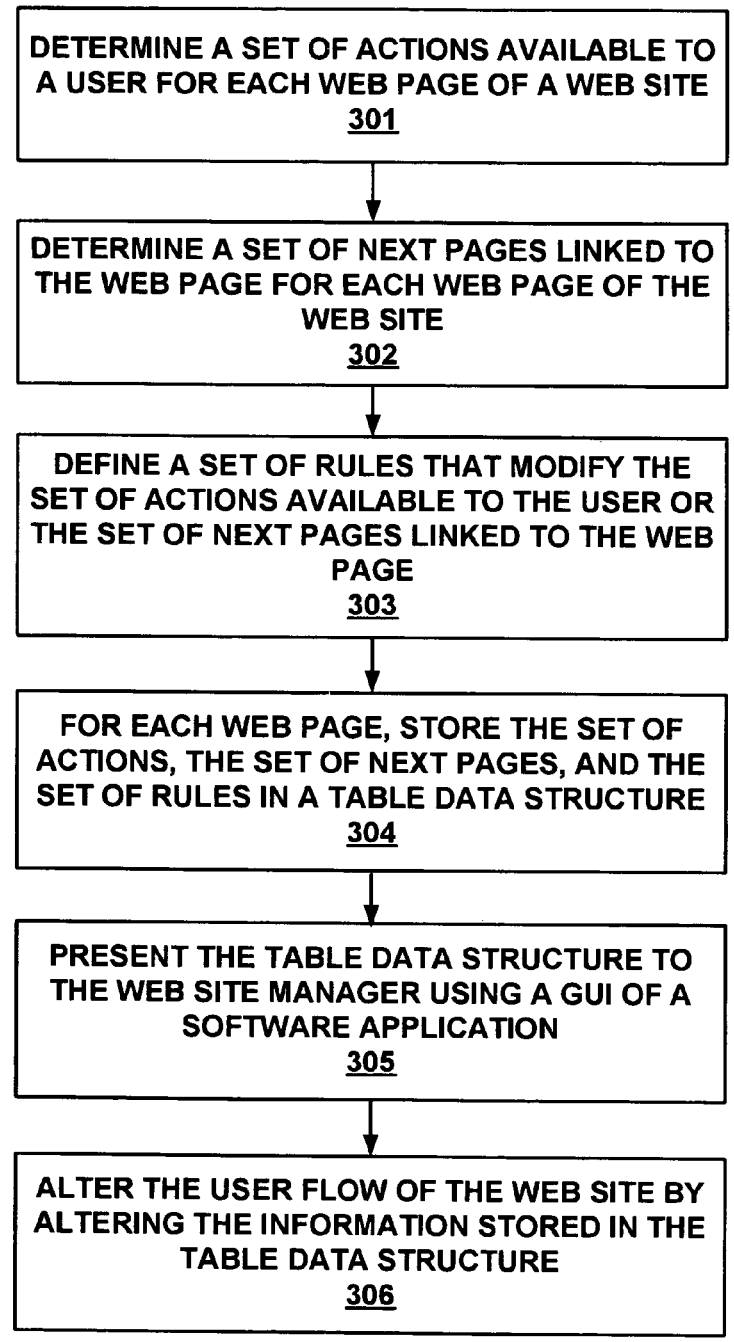
FIG. 3 shows a flowchart of the steps of a user flow tracking process for a Web site in accordance with one embodiment of the present invention.

Referring now to FIG. 3, a flowchart of the steps of a user flow tracking process 300 for a Web site in accordance with one embodiment of the present invention is shown. Process 300 is a computer implemented method for tracking a user flow of Web pages of a Web site to enable efficient updating of the hyperlinks of the Web site, such as, for example, an electronic commerce Web site. Process 300 shows steps involved in setting up a Web site for use with tables and matrices as described above.

Process 300 begins in step 301, where a set of actions available to a user are determined for each Web page of a Web site. For each Web page of the Web site, the Web page is accessed and a set of actions available to a user (e.g., add items to a shopping cart, remove items from shopping cart, or the like) are determined for the Web page.

In step 302, a set of the next pages linked to the Web page is determined for each Web page of the Web site. The set of the next pages include, for example, product colors, features, customizations, etc.) linked to the Web page.

In step 303, for each Web page, a set of rules are defined that modify the set of actions available to the user or the set of next pages linked to the Web page in accordance with, for example, an identity of the user. As described above, the rule-based mechanism allows the customization of the flow for different types of accounts and/or for different individual customers. For example, a first-time customer would see a different set of price lists (e.g., customer price lists 109–112) than a large high-volume customer.

Referring still to process 300 of FIG. 3, in step 304, for each Web page, the set of actions, the set of next pages, and the set of rules are stored in a table data structure. The table data structure (e.g., table 200 of FIG. 2) includes columns for the current page, an action, a next page, and rules.

In step 305, the table data structure is presented to the Web site manager using a GUI of a software application (e.g., on a desktop computer system). The tabular attributes of the table data structure are well suited for use with a GUI software application. For example, the table data structure can be presented to the Web site manager (e.g., on a workstation display), either alone or with a set of such tables, to visually depict the flow of the Web site.

In step 306, the user flow of the Web page is changed/modified by altering the information stored in the table data structure. Thus, as described above, the Web site manager can alter, create, redefine, and otherwise manage the user flow of the entire Web site through the intuitive graphical user interface representation of the matrix of table data structures.

Computer System Platform

Figure 4:
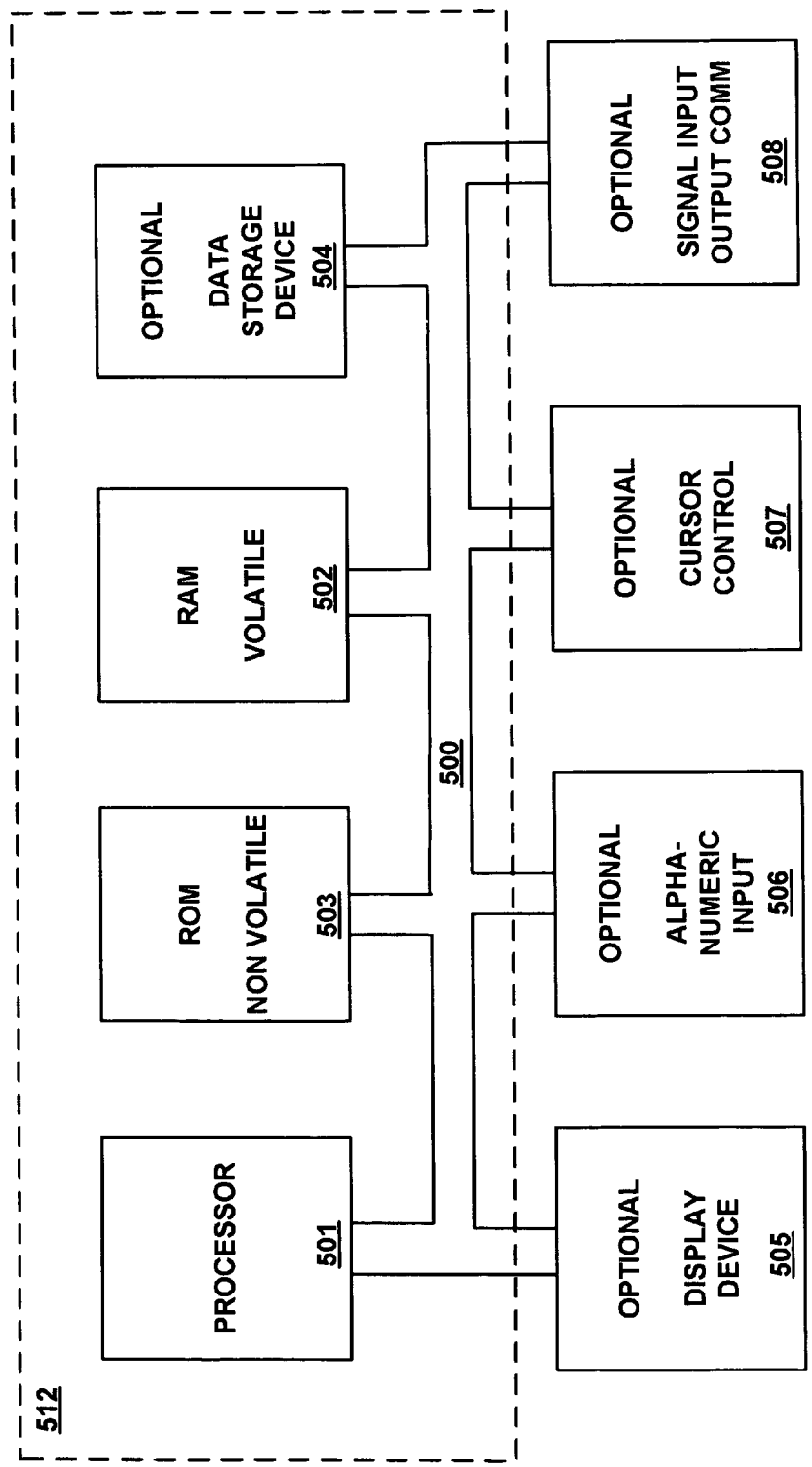
FIG. 4 shows the components of a computer system platform in accordance with one embodiment of the present invention.

With reference now to FIG. 4, a computer system 512 in accordance with one embodiment of the present invention is shown. Computer system 512 shows the components of a computer system in accordance with one embodiment of the present invention that provides the execution platform for implementing certain software based functionality of the present invention. As described above, certain processes and steps of the present invention are realized, in one embodiment, as a series of instructions (e.g., software program) that reside within computer readable memory units of a computer system (e.g., system 512) and are executed by the processor(s) of system 512. When executed, the instructions cause the computer system 512 to implement the functionality of the present invention as described above.

In general, computer system 512 shows the basic components of a computer system used to implement "server" machines and "client" machines. Computer system 512 comprises an address/data bus 500 for communicating information, one or more central processors 501 coupled with the bus 500 for processing information and instructions, a computer readable volatile memory unit 502 (e.g., random access memory, static RAM, dynamic, RAM, etc.) coupled with the bus 500 for storing information and instructions for the central processor(s) 501, a computer readable non-volatile memory unit (e.g., read only memory, programmable ROM, flash memory, EPROM, EEPROM, etc.) coupled with the bus 500 for storing static information and instructions for the processor(s) 501. System 512 also includes a mass storage computer readable data storage device 504 such as a magnetic or optical disk and disk drive coupled with the bus 500 for storing information and instructions. Optionally, system 512 can include a display device 505 coupled to the bus 500 for displaying information to the computer user, an alphanumeric input device 506 including alphanumeric and function keys coupled to the bus 500 for communicating information and command selections to the central processor(s) 501, a cursor control device 507 coupled to the bus for communicating user input information and command selections to the central processor(s) 501, and a signal generating device 508 coupled to the bus 500 for communicating command selections to the processor(s) 501.

Thus, the present invention provides a computer implemented method for tracking a user flow of Web pages of a Web site to enable efficient updating of the hyperlinks of the Web site. The present invention provides a solution that renders the update and maintenance process of a user flow of a Web site much easier than the prior art. The present invention provides a solution that simplifies the changing and maintaining of hyperlinks within Web pages of a Web site. The present invention improves the speed and responsiveness of the resulting site to changing conditions, customers, and the like. Additionally, the present invention streamlines the Web site maintenance process while retaining reliable technical aspects (e.g., java, HTML, etc.) of the Web site.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A method for tracking a user flow of Web pages of a Web site to enable efficient updating of the hyperlinks of the Web site, the method comprising the steps of:
    a) accessing a Web page out of a plurality of Web pages of a Web site;
    b) determining a set of actions available to a user for Web page;
    c) determining a set of the next pages linked to the Web page;
    d) defining a set of rules that modify the set of actions available to the user or the set of next pages linked to the Web page in accordance with an identity of the user; and
    e) storing the set of actions, the set of next pages, and the set of rules in a table data structure for the Web page to track a user flow of the Web page.

2. The method of claim 1, further including the step of altering the user flow of the Web page by altering the corresponding set of rules in the table data structure for the Web page.

3. The method of claim 1, further including the step of altering the user flow of the Web page by altering the set of actions available to the user in the table data structure for the Web page.

4. The method of claim 1, further including the step of altering the user flow of the Web page by altering the set of next pages linked to the Web page in the table data structure for the Web page.

5. The method of claim 1, further including the step of defining the set of rules for the Web page to link a particular set of next Web pages for a particular user, the particular user determined by the identity.

6. The method of claim 1, further including the step of managing the user flow of the Web page using a graphical user interface presenting a depiction of the table data structure.

7. The method of claim 1, further including the steps of:
generating a plurality of table data structures for each of the plurality of Web pages of the Web site; and
storing the table data structures in a matrix to track a user flow of the Web site.

8. The method of claim 7, further including the step of altering a user flow of the Web site by altering the matrix of table data structures.

9. The method of claim 7, further including the step of managing a user flow of the Web site using a graphical user interface presenting a depiction of the matrix of table data structures.

10. An apparatus for tracking a user flow of Web pages of a Web site to enable efficient updating of the hyperlinks of the Web site, the apparatus including a computer system having a processor for executing computer readable instructions, which when executed cause the computer system to implement a method comprising the steps of:
a) accessing a Web page out of a plurality of Web pages of a Web site;
b) determining a set of actions available to a user for Web page;
c) determining a set of the next pages linked to the Web page;
d) defining a set of rules that modify the set of actions available to the user or the set of next pages linked to the Web page in accordance with an identity of the user; and
e) storing the set of actions, the set of next pages, and the set of rules in a table data structure for the Web page to track a user flow of the Web page.

11. The apparatus of claim 10, further including the step of altering the user flow of the Web page by altering the corresponding set of rules in the table data structure for the Web page.

12. The apparatus of claim 10, further including the step of altering the user flow of the Web page by altering the set of actions available to the user in the table data structure for the Web page.

13. The apparatus of claim 10, further including the step of altering the user flow of the Web page by altering the set of next pages linked to the Web page in the table data structure for the Web page.

14. The apparatus of claim 10, further including the step of defining the set of rules for the Web page to link a particular set of next Web pages for a particular user, the particular user determined by the identity.

15. The apparatus of claim 10, further including the step of managing the user flow of the Web page using a graphical user interface presenting a depiction of the table data structure.

16. The apparatus of claim 10, further including the steps of:
generating a plurality of table data structures for each of the plurality of Web pages of the Web site; and
storing the table data structures in a matrix to track a user flow of the Web site.

17. The apparatus of claim 16, further including the step of altering a user flow of the Web site by altering the matrix of table data structures.

18. The apparatus of claim 16, further including the step of managing a user flow of the Web site using a graphical user interface presenting a depiction of the matrix of table data structures.

19. A computer readable media for having computer readable instructions for implementing a method for tracking a user flow of Web pages of a Web site to enable efficient updating of the hyperlinks of the Web site, which when executed by a processor of a computer system cause the computer system to implement the steps of:
a) accessing a Web page out of a plurality of Web pages of a Web site;
b) determining a set of actions available to a user for Web page;
c) determining a set of the next pages linked to the Web page;
d) defining a set of rules that modify the set of actions available to the user or the set of next pages linked to the Web page in accordance with an identity of the user; and
e) storing the set of actions, the set of next pages, and the set of rules in a table data structure for the Web page to track a user flow of the Web page.

20. The computer readable media of claim 19, further including the step of altering the user flow of the Web page by altering the corresponding set of rules in the table data structure for the Web page.

21. The computer readable media of claim 19, further including the step of altering the user flow of the Web page by altering the set of actions available to the user in the table data structure for the Web page.

22. The computer readable media of claim 19, further including the step of altering the user flow of the Web page by altering the set of next pages linked to the Web page in the table data structure for the Web page.

23. The computer readable media of claim 19, further including the step of defining the set of rules for the Web page to link a particular set of next Web pages for a particular user, the particular user determined by the identity.

24. The computer readable media of claim 19, further including the step of managing the user flow of the Web page using a graphical user interface presenting a depiction of the table data structure.

25. The computer readable media of claim 19, further including the steps of:
generating a plurality of table data structures for each of the plurality of Web pages of the Web site; and
storing the table data structures in a matrix to track a user flow of the Web site.

26. The computer readable media of claim 25, further including the step of altering a user flow of the Web site by altering the matrix of table data structures.

27. The computer readable media of claim 26, further including the step of managing a user flow of the Web site using a graphical user interface presenting a depiction of the matrix of table data structures.

* * * * *